United States Patent [19]

Mulvey

[11] 4,365,333
[45] Dec. 21, 1982

[54] TEST SIGNAL GENERATOR

[75] Inventor: Steven J. Mulvey, East Greenbush, N.Y.

[73] Assignee: National Railroad Passenger Corporation, Washington, D.C.

[21] Appl. No.: 189,395

[22] Filed: Sep. 22, 1980

[51] Int. Cl.³ ............................................. B60T 8/12
[52] U.S. Cl. ..................................... 371/27; 303/92; 340/52 B
[58] Field of Search ........................ 303/92; 371/27; 340/52 B; 73/39, 121; 364/426, 579

[56] References Cited

U.S. PATENT DOCUMENTS

| | | | |
|---|---|---|---|
| 3,818,433 | 6/1974 | Okamoto et al. | 303/92 |
| 3,866,980 | 2/1975 | Eisele et al. | 303/92 |
| 3,907,380 | 9/1975 | Fleischer et al. | 303/92 |
| 4,080,654 | 3/1978 | Walley, Jr. | 364/426 |
| 4,106,820 | 8/1978 | Ruhnau et al. | 303/92 |
| 4,252,014 | 2/1981 | Ruof | 303/92 |

*Primary Examiner*—Charles E. Atkinson
*Attorney, Agent, or Firm*—Beveridge, De Grandi & Kline

[57] ABSTRACT

A test signal generator for generating signals simulating the signals obtained from the axles of a railroad car, to permit testing of a railroad car brake controller. During testing of the controller for detection of excessive speed difference between the four axles of a railroad car, the output from a variable frequency oscillator is gated to a first one of the four controller input circuits, while the output from a fixed frequency oscillator is gated to the remaining three input circuits. The output frequency of the variable frequency oscillator is changed to simulate an axle signal indicating to the first input circuit a speed different from the speed indicated to the other three input circuits by the fixed frequency oscillator output. This frequency change continues until the controller indicates an excessive speed difference. During testing for rate of deceleration, the output from a voltage controlled oscillator is gated to a first one of the four controller input circuits. During a first interval of time the oscillator output frequency decreases at a first rate, simulating a railroad car axle signal during normal braking. During a second interval of time the oscillator output frequency decreases at a second, higher rate, simulating a railroad car axle signal with abnormal braking, either with slipping or just prior to slipping. A switch determines whether the excessive speed difference simulation or the deceleration simulation is provided. A multiplexer determines which of the four controller input circuits is selected as the first one. During deceleration testing, the controller can operate in an automatic mode in which receipt of a signal from the controller indicating detection of excessive deceleration sequences the multiplexer so that another of the input circuits is selected as the first one and initiates another cycle of operation.

6 Claims, 1 Drawing Figure

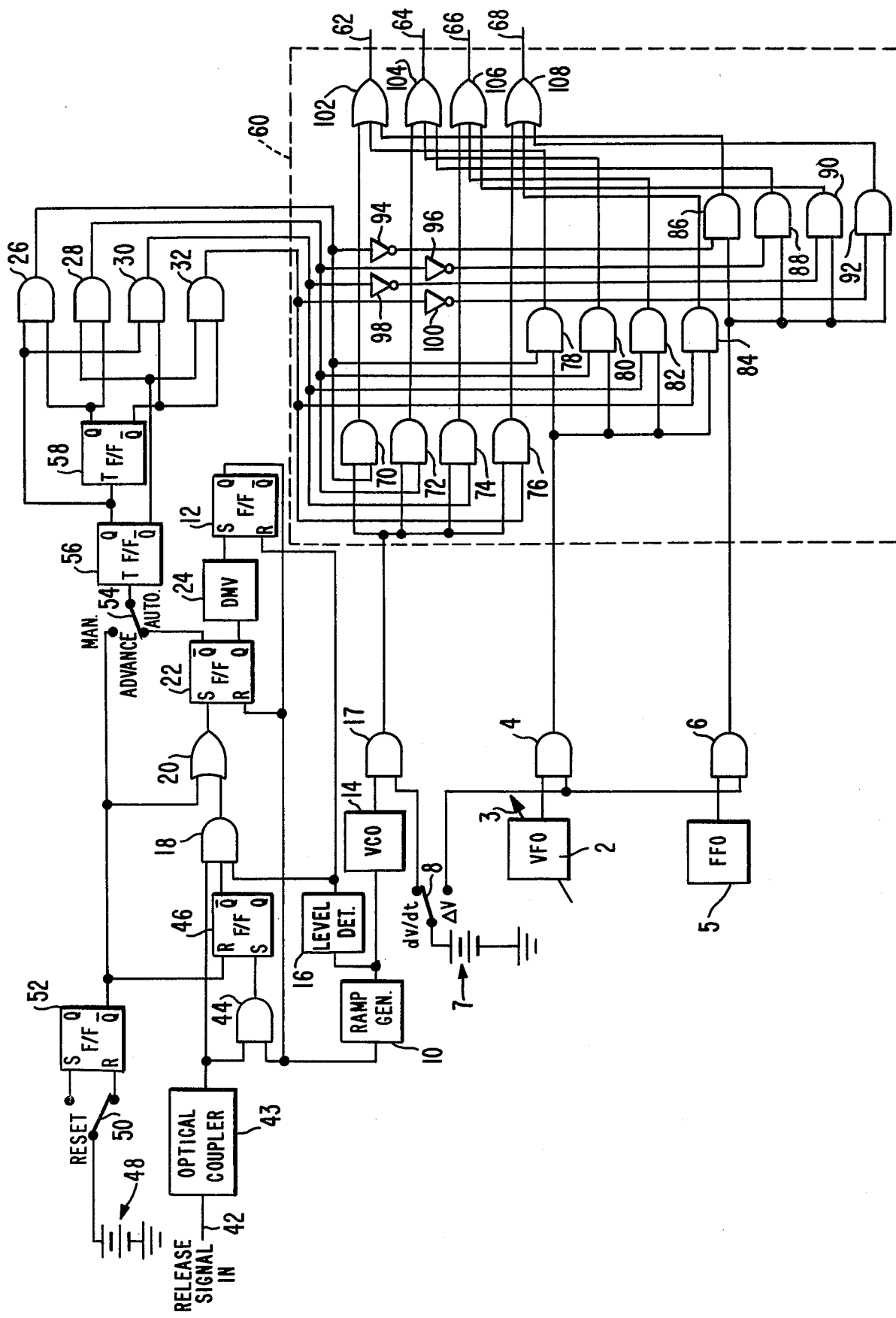

TEST SIGNAL GENERATOR

BACKGROUND OF THE INVENTION

The present invention pertains to a test signal generator. More particularly, the present invention pertains to a circuit for generating signals for testing a brake controller for a railroad car.

Railroad cars generally are equipped with a truck at each end, each truck having two axles with a wheel on each end of each axle. The two wheels of an axle turn together as a set, but each axle of a truck is independent, and, of course, the two trucks are independent. Thus, each axle of a railroad car rotates independently of the other three axles of that car and independently of all the axles of other cars.

When it is necessary to slow or stop a railroad car, the pneumatic brakes of the car are applied. Maximum braking occurs when the wheels are braked to a point just before slipping of the wheel on the railroad track. Slipping of the wheels on the track is undesirable primarily because such slipping results in less than maximum braking. Additionally, slipping is undesirable because it causes wear on that spot of the wheel at which the slipping occurs, producing a "flat" on the wheel.

Slipping of a wheel can be sensed either as it occurs or just prior to occurrence by sensing the speed of the wheels. First of all, comparison of the speed of the wheels of one axle of a railroad car with the speeds of the wheels of the other three axles of that same railroad car indicates whether the four axles are stopping at the same rate. Excessive speed differences indicate abnormal braking. Secondly, sensing the rate of stopping or deceleration of the wheels of an axle indicates whether the wheel is decelerating so rapidly as to indicate slipping.

Generally railroad cars are equipped with devices which sense these wheel conditions and control the application of pneumatic pressure to the brakes. Thus, for example, the E-5 Decelostat Controller System available from Westinghouse Air Brake Company senses the speed of each of the four sets of wheels of the railroad car and from those speeds determines whether slipping is indicated. Thus, the E-5 Decelostat Controller System has four input circuits so that it receives simultaneously a speed signal from each of the four axles of a railroad car. The equipment makes two different comparisons of wheel speed. First of all, the equipment compares the speeds of each of the four sets of wheels, and if the speed of any of the four sets of wheels differs from the speed of any other set by an amount indicating that one set is slipping while the other set is not, the equipment generates a signal to release the pneumatic pressure for the brakes on the truck of the slipping wheel. Secondly, the equipment senses the rate of deceleration of each set of wheels, and if any set of wheels is decelerating at so high a rate as to indicate slipping, the equipment likewise generates a signal to release the pneumatic pressure for the brakes of the associated truck.

Accordingly, the safe braking of railroad cars is dependent upon proper operation of the controller. It is thus necessary to be able to test the controller to assure that it is operating properly.

SUMMARY OF THE INVENTION

The present invention is a test signal generator for applying to a brake controller for railroad cars signals simulating the signals from the axles of the cars indicative of normal braking and indicative of abnormal braking, either with slipping or just prior to slipping. The test signal generator in accordance with the present invention, is capable of performing two different tests on a railroad car brake controller. During the first test, a signal of a constant frequency is applied to three of the input circuits of a controller, while a signal of a controllable frequency is varied until the controller provides an output signal to release the brakes. By monitoring the frequencies of the signals from the present circuit at which the controller initiates this output signal, it is possible to determine whether the controller is operating properly to detect speed differences between the different sets of wheels of a railroad car.

In the second test during a first interval of time the frequency of the output voltage from a voltage controlled oscillator is decreased at a first rate, simulating a signal indicative of normal braking, and then during a second interval of time the oscillator frequency decreases at a second rate, simulating a signal indicative of abnormal braking, either slipping or just prior to slipping. The oscillator output signal is applied sequentially to each of the four input circuits of the controller to simulate in turn slipping of the associated sets of wheels.

During this second test, the output voltage from a voltage ramp generator is applied to the input of a voltage controlled oscillator, causing the frequency of the oscillator output signal to decrease at a first rate, simulating normal braking, during a first period of time, and then to decrease at a second, higher rate, simulating slipping or other abnormal braking, during a second period of time. The oscillator output signal is gated in turn to each of the brake controller input circuits. During the first interval, when the frequency of the oscillator output signal is decreasing at a rate indicative of normal braking, no control signal should be generated by the controller. During the second interval, when the oscillator output frequency is decreasing at a rate indicative of abnormal braking, the controller should generate a control signal to release pneumatic pressure to the brakes. This Release signal results in gating of the oscillator output signal to the next input circuit of the brake controller and otherwise returns the circuit of the present invention to its initial condition so that the test can be repeated on that next input circuit. If a Release signal is received during the first interval when the oscillator output simulates normal braking, or if no Release signal is received during the second interval when the oscillator output simulates abnormal braking, the circuit of the present invention is prevented from continuing its operation until it has been manually reset, and an indicator is energized to indicate which brake controller input circuit failed the test.

BRIEF DESCRIPTION OF THE DRAWING

These and other aspects and advantages of the present invention are more apparent in the following detailed description and claims, particularly when considered in conjunction with the accompanying drawing which is a logical block diagram illustrating the functional operation of a preferred embodiment of test signal generator in accordance with the present invention.

DETAILED DESCRIPTION OF THE INVENTION

In the circuit of the drawing, variable frequency oscillator 2, which is provided with frequency control 3, has its output connected to one input of AND gate 4. Fixed frequency oscillator 5, which might be a crystal controlled oscillator, has its output connected to one input of AND gate 6. Positive voltage source 7 is connected to the movable contact of single-pole-double-throw switch 8. The first fixed contact of switch 8 is connected to the second input of AND gate 4 and to the second input of AND gate 6.

Voltage ramp generator 10 has its input connected to the Q output of bistable multivibrator or flip-flop 12 so that the ramp generator is controlled by the state of flip-flop 12. The output of ramp generator 10 is connected to the input of voltage controlled oscillator 14 and to the input of voltage level detector 16. The output of voltage controlled oscillator 14 is connected to one input of AND gate 17, the second input of which is connected to the second fixed contact of switch 8. The output of level detector 16 is tied to the reset input of flip-flop 12 and to one input of AND gate 18, the output of which passes through OR gate 20 to the set input of flip-flop 22. The reset input of flip-flop 22 is connected to the Q output of flip-flop 12. The Q output of flip-flop 22 is connected to the input of monostable multivibrator or delay multivibrator (DMV) 24, the output of which is connected to the set input of flip-flop 12.

Should a brake controller under test sense wheel slippage or other abnormal braking, the controller generates a signal to cause release of the pneumatic pressure for the associated truck. That signal is applied by input line 42 to optical coupler 43, the output of which is connected to a second input of AND gate 18 and to one input of AND gate 44. The second input of AND gate 44 is connected to the Q output of flip-flop 12, and the output of gate 44 is connected to the set input of flip-flop 46. The $\overline{Q}$ output of flip-flop 46 is connected to the third input of AND gate 18.

Positive voltage source 48 is tied to the moving contact of single-pole-double-throw switch 50, designated as Reset switch 50. The first fixed contact of switch 50 is connected to the set input of flip-flop 52, while the second fixed contact of the switch is connected to the reset input of flip-flop 52. Flip-flop 52, thus, assures that contact bounce of switch 50 does not erroneously result in multiple output signals. The $\overline{Q}$ output of flip-flop 52 is tied to the reset input of flip-flop 46 and to the second input of OR gate 20. The flip-flop 52 Q output is also connected to one fixed contact of single-pole-double-throw switch 54 or Advance switch 54, and this contact is designated the Manual position of the switch. The second fixed contact of switch 54, designated the Automatic position of the switch, is tied to the $\overline{Q}$ output of flip-flop 22. The moving contact of switch 54 is connected to the toggle input of JK flip-flop 56. The Q output of flip-flop 56 is tied to the toggle input of JK flip-flop 58 and to one input of AND gate 26 and one input of AND gate 30. The $\overline{Q}$ output of flip-flop 56 is connected to one input of AND gate 28 and one input of AND gate 32. The Q output of flip-flop 58 is connected to one input of AND gate 26 and to one input of AND gate 28. The $\overline{Q}$ output of flip-flop 58 is connected to one input of AND gate 30 and to one input of AND gate 32. Thus, each cycle of actuation of Reset switch 50 while switch 54 is in its Manual position, and each resetting of flip-flop 22 while switch 54 is in its Automatic position toggles the counting chain of flip-flops 56 and 58 so that AND gates 26–32 are sequenced to cause each AND gate in turn to provide an output signal.

The outputs of AND gates 4, 6 and 17 are applied to multiplexer 60 which gates the desired test signals to the four output lines 62, 64, 66, and 68 for the four input circuits of the railroad car brake controller. While any of numerous suitable multiplexers could be utilized in accordance with the present invention, the drawing illustrates one form of multiplexer 60. AND gate 17 has its output connected to one input of each of AND gates 70, 72, 74, and 76. AND gate 4 has its output connected to one input of each of AND gates 78, 80, 82, and 84. AND gate 6 has its output connected to one input of each of AND gates 86, 88, 90, and 92. AND gate 26 has its output connected to the second input of AND gate 70, connected to the second input of AND gate 78, and coupled through inverter 94 to the second input of AND gate 86. AND gate 28 has its output connected to the second input of AND gate 72, connected to the second input of AND gate 80, and coupled through inverter 96 to the second input of AND gate 88. AND gate 30 has its output connected to the second input of AND gate 74, connected to the second input of AND gate 82, and coupled through inverter 98 to the second input of AND gate 90. AND gate 32 has its output connected to the second input of AND gate 76, connected to the second input of AND gate 84, and coupled through inverter 100 to the second input of AND gate 92. OR gate 102 receives as inputs the outputs from AND gates 70, 78, and 86 and has its output connected to output line 62 from multiplexer 60 to provide signals to the first input circuit of the railroad car brake controller. OR gate 104 has its inputs connected to the outputs of AND gates 72, 80, and 88 and its output connected to output line 64 to provide signals to the second input circuit of the brake controller. The outputs from AND gates 74, 82, and 90 are applied through OR gate 106 to multiplexer output line 66 which provides signals to the third input circuit of the brake controller. OR gate 108 receives as inputs the outputs, of AND gates 76, 84, and 92 and has its output connected to output line 68 from multiplexer 60 to provide signals to the fourth input circuit of the railroad car brake controller.

With switch 8 in its first position, signals from variable frequency oscillator 2 pass through AND gate 4 to each of AND gates 78, 80, 82, and 84, and signals from fixed frequency oscillator 5 pass through AND gate 6 to each of AND gates 86, 88, 90, and 92, however, AND gate 17 is blocked. Assume that advance switch 54 is in its Manual position and that both flip-flop 56 and flip-flop 58 are set so that AND gate 26 is providing a signal. Signals from variable frequency oscillator 2 then pass through AND gate 78 and OR gate 102 to output line 62; however, AND gates 80, 82, and 84 are blocked, and due to inverters 94, 96, 98, and 100, AND gate 86 is blocked, and signals from fixed frequency oscillator 5 pass through AND gates 88, 90, and 92 and OR gates 104, 106, and 108 to output lines 64, 66, and 68. As control 3 is operated, the frequency of the signal on line 62 changes. When Reset switch 50 is cycled, the counting chain of flip-flops 56 and 58 is toggled, and AND gates 80, 86, 90, and 92 are enabled to pass signals, while AND gates 78, 82, 84, and 88 are blocked. Consequently, the output of variable frequency oscillator 3 is provided on output line 64 to the second input circuit of the railroad car brake controller, while the output of fixed frequency oscillator 5 is provided on output lines 62, 66, and 68 to the first, third, and fourth input circuits. The next cycling of Reset switch 50 places the variable frequency output signal on line 66 and the fixed frequency signal on lines 62, 64, and 68, and the following cycling of switch 50 places the variable frequency signal on line 68 and the fixed frequency on lines 62, 64, and 66. Another cycling of switch 50 returns the variable frequency signal to line 62.

With switch 8 in its second position, the output signal from voltage controlled oscillator 14 passes through AND gate 17 to each AND gate 70, 72, 74, and 76. If flip-flops 65 and 58 are set, the output of AND gate 26 enables the voltage controlled oscillator signal to pass through AND gate 70 and OR gate 102 to output line 62 which applies the signal to the first input circuit of the railroad car brake controller. AND gates 72, 74, and 76 are blocked. Cycling of switch 50 toggles the counting chain of flip-flops 56 and 58 to cause an output from AND gate 28, and so AND gates 70, 74 and 76 are blocked, while the output of voltage controlled oscillator 14 passes through AND gates 17 and 72 and OR gate 104 to the second output line 64. Repeated cycling of switch 50 steps the voltage controlled oscillator output signal to output line 66, then to output line 68, and then back to output line 62.

When the railroad car brake controller is to be tested to determine whether it properly senses excessive speed difference between different sets of wheels on a railroad car, referred to as the ΔV test, switch 8 is closed to its first moving contact, referred to as its ΔV position, enabling the outputs of variable frequency oscillator 2 and fixed frequency oscillator 5 to pass through AND gates 4 and 6, respectively. These oscillator outputs then pass through multiplexer 60, as described above, to the appropriate output lines 62, 64, 66, and 68, as determined by the state of the counting chain of flip-flop 56 and 58. Control 3 is operated to vary the frequency of the output of oscillator 2 until the brake controller under test generates a signal to release the pneumatic pressure. The oscillator frequency at which this occurs can be determined, for example by observing an indicator to which the output of variable frequency oscillator 2 is applied. From this frequency information and the frequency of the signal from fixed frequency oscillator 5, the simulated velocity difference at which the control responds can be determined.

To test the deceleration monitoring response of the brake controller, switch 8 is closed against its second fixed contact, referred to as its dv/dt position. Consequently, AND gates 4 and 6 are blocked, and the output of voltage controlled oscillator 14 passes through AND gate 17 to multiplexer 60. As the initial condition, flip-flop 46 is set and flip-flops 12 and 22 are reset. Consequently, voltage ramp generator 10 is deactivated. Assume that the $\overline{Q}$ outputs of flip-flops 56 and 58 are applying signals to the AND gates 26–32, and that Advance switch 54 is in its Automatic position. As a consequence, AND gate 32 is enabled, while AND gates 26, 28, and 30 are blocked. Cycling of Reset switch 50 causes a pulse from flip-flop 52 which resets flip-flop 46 and which also passes through OR gate 20 to set flip-flop 22. After the delay of DMV 24, flip-flop 12 is set, and the Q output from flip-flop 12 resets flip-flop 22. The $\overline{Q}$ output from flip-flop 22 toggles flip-flops 56 and 58 so that AND gate 26 is enabled while gates 28, 30, and 32 are blocked.

The Q output from flip-flop 12 also activates ramp generator 10. Initially, the output voltage from the ramp generator increases at a first rate, causing the frequency of the output voltage from voltage controlled oscillator 14 to decrease at a first rate, simulating normal or safe braking. Consequently, no Release signal should be applied by the brake controller to input line 42.

When the voltage from ramp generator 10 reaches a preset level, level detector 16 is triggered to apply a signal to one input of AND gate 18 and to reset flip-flop 12. Termination of the Q output from flip-flop 12 causes the voltage from ramp generator 10 to increase at a second, higher rate, and so the frequency of the output voltage from voltage controlled oscillator 14 decreases at a higher rate. The higher rate of decrease of the frequency of the output from voltage controlled oscillator 14 simulates slipping or other undesirable braking condition. This signal is passed through AND gate 17 and multiplexer 60 to output line 62. If the brake controller detects this condition, a Release signal is received on line 42. Since flip-flop 12 is reset, AND gate 44 cannot pass this Release signal. However, the Release signal is passed by AND gate 18 and OR gate 20 to set flip-flop 22, initiating testing of the detector connected to the next output line 64. Each time a satisfactory test is conducted, the circuit cycles, to repeat the test with the next AND gate in sequence from the set of AND gates 26–32 applying a signal to multiplexer 60 so that the output signal from oscillator 14 is applied to the next output line in sequence. Therefore, the railroad car brake controller is tested as each of its four input circuits receives the signal simulating the output from a railroad car axle.

Should the brake controller fail to initiate a Release signal during the time voltage controlled oscillator 14 is providing a signal simulating slippage to one of its input circuits, flip-flop 22 will not trigger delay multivibrator 24. Consequently, the circuit does not cycle but instead remains connected to the same input circuit of the railroad car brake controller. By providing an indicator such as a light attached to each output line 62, 64, 66, and 68, the railroad brake car controller input circuit receiving the simulated railroad car axle signal at the time of failure can be indicated.

Should the railroad car brake controller generate a Release signal during the time voltage control oscillator 14 is simulating normal braking, that Release signal on line 42 passes through AND gate 44. However, since level detector 16 is not providing an output, AND gate 18 is blocked. The output of gate 44 sets flip-flop 46, terminating the $\overline{Q}$ output from flip-flop 46 so that gate 18 remains blocked even after ramp generator 10 triggers level detector 16. Again, the circuit remains connected to the same input circuit.

In either of these fail conditions, the circuit of FIG. 1 is reset by first turning switch 50 to set flip-flop 52 and then turning the switch to reset flip-flop 52. The resulting $\overline{Q}$ signal from flip-flop 52 resets flip-flop 46 and sets flip-flop 22 to trigger delay multivibrator 24, setting flip-flop 12 and initiating another sequence of operation.

If switch 54 is turned to its Manual position, then the counting flip-flops 56 and 58 are not cycled by flip-flop 22, and instead the test repeats with the same input circuit in use until switch 50 is cycled to manually sequence the AND gates 26–32.

The above detailed description has been with reference to positive logic, that is logic in which presence of a signal results in a positive voltage while absence of a signal results in no voltage or ground. Thus, for example, in accordance with this convention, the flip-flops are set by a positive-going voltage applied to their set input to provide a positive voltage signal at their Q output and are reset by a positive-going voltage applied to their reset input to provide a positive voltage signal at their $\overline{Q}$ output. Negative logic or mixed logic could be utilized with some circuit changes. If, for example, the flip-flops are set by a positive-going signal applied to their set input to provide a negative voltage, a low level voltage or ground at their Q output, then minor changes are required. Among these are replacing the flip-flop 12 Q output applied to AND gate 44 and to ramp generator 10 with the flip-flop 12 $\overline{Q}$ output; replacing the flip-flop 22 Q output applied to DMV 24 with the flip-flop $\overline{Q}$ output; and replacing the flip-flop 22 $\overline{Q}$ output applied to the Automatic contact of switch 54 with the flip-flop 22 Q output. Other such changes might also be made for circuit optimization.

Additionally, the particular components selected for the circuitry may necessitate minor circuit modifications or make such modifications desirable. By way of example, voltage controlled oscillator 14 might be a National Semiconductor Corporation LM566 voltage controlled oscillator. This component has been found to have non-linear performance in that upon application of a linear input voltage, the oscillator frequency decreases linearly for a first interval, then remains substantially constant for a brief interval, and then decreases linearly during a third interval with the rate of frequency decrease during the third interval being greater than the rate of frequency decrease during the first interval. Use of this component does not require resetting of flip-flop 12 to increase the rate of change of voltage from ramp generator 10. Level detector 16, then, can be based on a National Semiconductor Corporation LM1458 operational amplifier connected to initiate an output signal at the ramp generator voltage at which the voltage controlled oscillator output signal is in its brief, constant frequency interval. Ramp generator 10 can be a National Semiconductor Corporation LM555 timer connected as a linear ramp generator. Once triggered, this device operates until its ramp voltage reaches a preset level, even after the initiating signal has terminated. Other suitable components could, of course, be utilized in place of the above-mentioned ones.

What is claimed is:

1. A test signal generator for generating signals simulating the signals obtained from the axles of a railroad car, to permit testing of a railroad car brake controller, said generator comprising:
   (a) a voltage controlled oscillator;
   (b) a voltage ramp generator for sequentially applying to said voltage controlled oscillator an input voltage changing at a first rate and then an input voltage changing at a second rate to cause the frequency of the output signal from said voltage controlled oscillator sequentially to decrease at a first rate simulating the signals obtained from an axle of a railroad car during normal braking and then to decrease at a second rate simulating the signals obtained from an axle of a railroad car during abnormal braking either with slipping or just prior to slipping;
   (c) a voltage level detector for detecting the voltage level of the voltage ramp generator output applied as an input voltage to said voltage controlled oscillator;
   (d) input means for receiving from a railroad car brake controller a control signal indicative of sensing by the controller of a railroad car axle signal indicating normal braking of the railroad car;
   (e) manual initiating means for initiating operation of said voltage ramp generator;
   (f) first control means coupled to said input means and to said voltage level detector and, after said voltage level detector has detected a voltage ramp generator output voltage level at which said voltage ramp generator changes from applying to said voltage controlled oscillator an input voltage changing at the first rate to applying to said voltage controlled oscillator an input voltage changing at the second rate, responsive to receipt of a control signal by said input means for initiating operation of said voltage ramp generator;
   (g) a plurality of output lines, each adapted for connection to an input circuit of a railroad car brake controller;
   (h) a multiplexer coupled to said output lines;
   (i) a variable frequency oscillator including means for controlling the output frequency thereof;
   (j) a fixed frequency oscillator;
   (k) second control means coupled to said variable frequency oscillator, said fixed frequency oscillator, said voltage controlled oscillator, and said multiplexer, and capable of alternatively assuming a first position in which the outputs of said variable frequency oscillator and said fixed frequency oscillator are applied to said multiplexer for application of said variable frequency oscillator output to a first one of said plurality of output lines and application of said fixed frequency oscillator output to the other ones of said plurality of output lines, and a second position in which the output of said voltage controlled oscillator is applied to said multiplexer for application to said first one of said plurality of output lines; and
   (l) means for sequencing said multiplexer to select different ones of said output lines as said first one of said plurality of output lines.

2. A test signal generator for generating signals simulating the signals obtained from the axles of a railroad car, to permit testing of a railroad car brake controller, said generator comprising:
   (a) a voltage controlled oscillator;
   (b) a voltage ramp generator for sequentially applying to said voltage controlled oscillator an input voltage changing at a first rate and then an input voltage changing at a second rate to cause the frequency of the output signal from said voltage controlled oscillator sequentially to decrease at a first rate simulating the signals obtained from an axle of a railroad car during normal braking and then to decrease at a second rate simulating the signals obtained from an axle of a railroad car during abnormal braking either with slipping or just prior to slipping;
   (c) a voltage level detector for detecting the voltage level of the voltage ramp generator output applied as an input voltage to said voltage controlled oscillator;

(d) input means for receiving from a railroad car brake controller a control signal indicative of sensing by the controller of a railroad car axle signal indicating abnormal braking of the railroad car;
(e) manual initiating means for initiating operation of said voltage ramp generator;
(f) first control means coupled to said input means and to said voltage level detector and, after said voltage level detector has detected a voltage ramp generator output voltage level at which said voltage ramp generator changes from applying to said voltage controlled oscillator an input voltage changing at the first rate to applying to said voltage controlled oscillator an input voltage changing at the second rate, responsive to receipt of a control signal by said input means for initiating operation of said voltage ramp generator;
(g) a plurality of output lines, each adapted for connection to an input circuit of a railroad car brake controller;
(h) a multiplexer connected to said voltage controlled oscillator and to said plurality of output lines for coupling said voltage controlled oscillator to a selected one of said plurality of output lines for application of the voltage controlled oscillator output signal thereto; and
(i) means for sequencing said multiplexer to select different ones of said output lines for application of the voltage controlled oscillator output signal thereto.

3. A test signal generator as claimed in claim 1 or 2 in which said sequencing means comprises means coupling said first control means to said multiplexer for sequencing said multiplexer with each initiation of operation of said voltage ramp generator by said first control means.

4. A test signal generator as claimed in claim 1 or 2 in which said sequencing means comprises means coupling said manual initiating means to said multiplexer for sequencing said multiplexer with each initiation of operation of said voltage ramp generator by said manual initiating means.

5. A test signal generator as claimed in claim 1 or 2 in which said sequencing means comprises switching means capable of assuming a first position coupling said first control means to said multiplexer for sequencing said multiplexer with each initiation of operation of said voltage ramp generator by said first control means and a second position coupling said manual initiating means to said multiplexer for sequencing said multiplexer with each initiation of operation of said voltage ramp generator by said manual initiating means.

6. A test signal generator for generating signals simulating the signals obtained from the axles of a railroad car, to permit testing of a railroad car brake controller, said generator comprising:
(a) a variable frequency oscillator including means for controlling the output frequency thereof;
(b) a fixed frequency oscillator;
(c) a plurality of output lines, each adapted for connection to an input circuit of a railroad car brake controller;
(d) a multiplexer connected to said variable frequency oscillator, to said fixed frequency oscillator, and to said plurality of output lines for applying said variable frequency oscillator output to a first one of said plurality of output lines and applying said fixed frequency oscillator output to the other ones of said plurality of output lines; and
(e) means for sequencing said multiplexer to select different ones of said output lines as said first one of said plurality of output lines.

* * * * *